Figure 1:
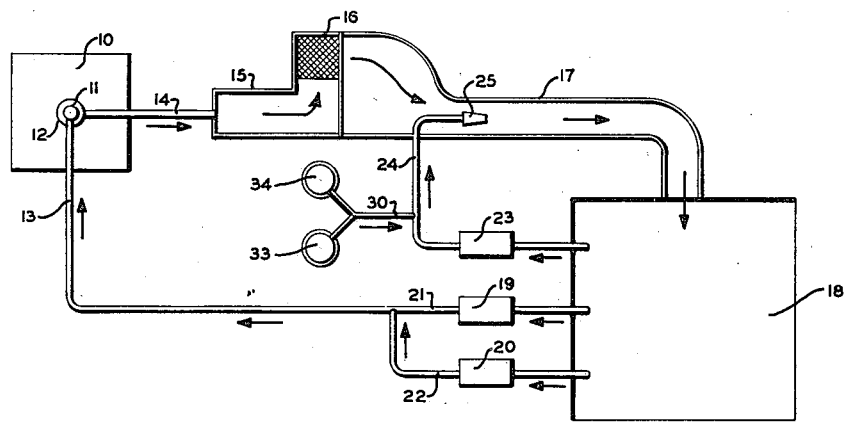

May 6, 1941.  W. W. ROBINSON ET AL  2,241,273

METHOD OF AND APPARATUS FOR TREATMENT OF DRILLING MUD

Filed July 1, 1939

WILLIAM W. ROBINSON
ROBERT R. CRIPPEN
INVENTORS

BY R. J. Dearborn
Daniel Stryker
THEIR ATTORNEYS

Patented May 6, 1941

2,241,273

UNITED STATES PATENT OFFICE 2,241,273

METHOD OF AND APPARATUS FOR TREATMENT OF DRILLING MUD

William W. Robinson and Robert R. Crippen, Long Beach, Calif., assignors to The Texas Company, New York, N. Y., a corporation of Delaware Application July 1, 1939, Serial No. 282,390

6 Claims. (Cl. 255—1)

This invention relates to the conditioning of drilling fluid and more particularly to the conditioning of drilling mud employed in the drilling of wells.

In the co-pending application of Allen D. Garrison Serial No. 282,445, filed of even date herewith, there is disclosed and claimed the conditioning of a drilling fluid by treatment with carbon dioxide gas to regulate its properties in order to maintain the drilling mud in suitable condition for recirculation during the progress of the drilling operation. In that application, a carbon dioxide-containing gas, such as from a pressure container of liquefied carbon dioxide or flue gas, is aspirated into a circulating mud stream by the suction effect created by the injection of recycled drilling mud through an aspirator mud gun into the main mud stream.

In some cases, it is found that flue gases do not contain a sufficient proportion of carbon dioxide to effect the desired conditioning of the circulating drilling mud. While liquefied carbon dioxide is available in pressure containers to supply a more concentrated carbon dioxide gas for this purpose, such containers are relatively expensive and require considerable handling by reason of transporation to and from the field.

The present invention constitutes an improvement on the method and apparatus disclosed in that application, and contemplates the use of carbon dioxide ice, or dry ice, for supplying the $CO_2$ gas required in the treatment. In this manner, the handling and transportation of pressure containers in the field is avoided and other advantages obtained, as set forth more fully below.

It is an object of the present invention to provide a method of and apparatus for the conditioning of drilling fluid with carbon dioxide gas by the use of dry ice in a simple and expeditious manner.

Further objects and adavntages of the invention will be apparent from the following description when taken in conjunction with the accompanying drawing and the appended claims.

Drilling muds are essentially mixtures of clay and water, usually so compounded that they weigh from about eight to twelve pounds per gallon. Whenever it is found necessary to increase the specific gravity of a particular mud, it is customary to add thereto finely divided materials which have a high specific gravity such as barytes, etc. An ideal drilling mud is one which is thixotropic, that is to say, a fluid which, on agitation by pumping or otherwise, has a relatively low viscosity and is free-flowing, but when agitation is stopped, gradually sets or gels. This gelling action is sufficiently slow to permit the cuttings to settle two or three feet before the gel structure is strong enough to support them.

In conventional practice, a drilling mud is circulated down the well through the hollow drill stem to the locus of drilling where it picks up the cuttings and then returns up the well through the annular passage between the drill stem and the well casing to the head of the well. The drilling fluid mixture is then flowed through suitable screens to remove coarse particles, and thence by a flow passage or mud ditch into a settling pit where the cuttings settle out, leaving a supernatant substantially cuttings-free drilling mud. This drilling mud is then returned to the well for recirculation therein.

Tht treatment with carbon dioxide serves to maintain the circulating drilling mud within a controlled pH range, such as about 7.5 to 8.5, which is found to minimize deflocculation and accumulation of clay and shale being penetrated in the drilling mud, with resultant alteration in the viscosity, weight and other desirable characteristics of the mud during the progress of drilling. While the carbon dioxide can be added to the mud at various points in its circulating travel, it is found preferable to add the carbon dioxide to the mud stream containing suspended cuttings as it flows through the mud ditch to the settling pit. In order to aid flow through the mud ditch and to agitate the drilling mud therein, there is generally provided a mud gun which is supplied with recycled drilling fluid from the settling pit under high pressure, this gun discharging a jet of the fluid into the contents of the mud ditch in the direction of flow of the mixture passing therealong. The application of carbon dioxide to the mud is effectively made by introducing the carbon dioxide into the recycled fluid which is jetted by the mud gun into the contents of the mud ditch.

Figure 2:
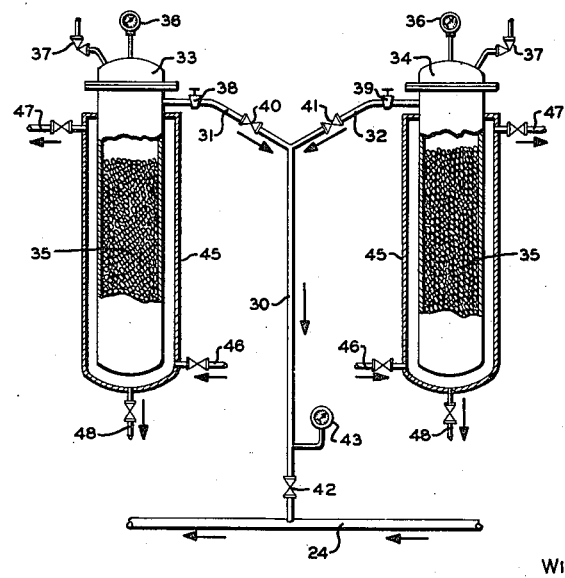

In the drawing which illustrates a preferred embodiment of the invention, Fig. 1 is a diagrammatic plan view of apparatus for the handling and recirculation of drilling mud in connection with the drilling of a well, disclosing the application of the present invention thereto; and Fig. 2 is an enlarged vertical sectional view of the dry ice converters and related mud-circulating line of the present invention.

Referring to the drawing, a well being treated is indicated at 10 having a hollow drill stem 11 and an outer casing 12. Drilling mud is circulated from the line 13 through the hollow drill stem 11 down the well to the locus of drilling where it picks up the cuttings and thence returns up the well through the annular space between the drill stem 11 and the casing 12 to the head of the well. From here, the mud mixture is discharged by pipe 14 into trough 15 feeding onto suitable screens 16, where the coarser particles are removed. The drilling mud with finer particles of suspended cuttings then flows through the flow passage or mud ditch 17 into settling pit 18, where the mud is allowed to remain in a quiescent condition for a time to permit settling of the cuttings. Suitable slush pumps 19 and 20 pick up the supernatant layer of drilling mud and return it by lines 21 and 22, respectively, to the line 13 for recirculation through the well. A mud pump 23 also picks up a portion of the supernatant mud and forces it under high pressure through the mud line 24 to a nozzle or mud gun 25 positioned within the mud ditch 17, to form a jet of the mud which induces flow of the main mud mixture through the ditch 17 while violently agitating the same.

As shown more particularly in Fig. 2, a line or header 30 is tapped into the mud line 24 intermediate the mud pump 23 and the nozzle 25. Header 30 communicates with branch lines 31 and 32 leading respectively to dry ice converters 33 and 34. Each of the converters may be constructed as cylindrical steel containers provided with removable heads, whereby dry ice indicated at 35 may be charged thereto. The converters are each equipped with pressure gauges 36, and suitable pressure relief or safety valves 37. The branch lines 31 and 32 contain pressure-reducing needle valves 38 and 39, and shut-off valves 40 and 41, respectively. The header 30 is equipped with a shut-off valve 42 and a suitable pressure gauge 43 by which the pressure of the circulating mud in the line 24 may be observed.

Each converter is also preferably provided with a suitable heating means, such as a jacket 45, to which steam which is readily available for power in the drilling operation may be supplied by inlet line 46 and discharged by exit line 47. Each jacket is also equipped with a suitable valve controlled drain 48. Any other suitable or convenient heating means may be provided for each converter, such as the provision of a hose through which hot water or steam can be played against the converter wall, or the use of a suitable coil to which a heating medium is supplied, the coil being positioned either exteriorly or interiorly of the converter.

In operation, the converters are filled with a quantity of dry ice which is preferably crushed or broken into small pieces. The pressure heads are then fastened in place and steam is supplied to the jacket 45. The dry ice begins to sublime creating a gas pressure which is registered by the gauges 36. Further heating causes melting and vaporization of the dry ice, in addition to the sublimation. Valve 42 is opened to obtain a reading of the pressure of the mud circulating through line 24. As the gas pressure within a converter, say converter 33, rises to a value substantially in excess of that in the mud line 24, the pressure relief valve 38 is cracked and the shut-off valve 40 opened to permit the gas to flow with some pressure reduction at a regulated rate into the mud line 24, the valves 39 and 41 being closed during this time. As the pressure within converter 33 drops to a value approaching that registered by gauge 43, valves 38 and 40 are closed, and valves 39 and 41 then correspondingly opened to permit gas to flow from converter 34 at a controlled rate into the mud line. This alternate flow from the converters is continued during the progress of drilling, the idle converter at any particular time being given an opportunity to regenerate sufficient gas pressure to be reopened to the mud line by the time the pressure in the other converter has dropped to the desired extent. While only two converters are shown, and are generally considered sufficient, it is to be understood that any suitable number may be provided and manifolded into the header 30 as illustrated.

By way of example, an operation was conducted in the drilling of a well in the California field, in which two converters charged with 150 pounds (3 blocks) each of dry ice in small pieces were manifolded into a header communicating with the mud line through which mud was recycled at a pressure of about 450 pounds per square inch. Maximum converter pressures throughout the run ranged from about 750 to 900 pounds per square inch. Rates of carbon dioxide addition were readily controlled by mounting the converters upon platform scales (not shown), the reduction in weight indicating the quantity of gas supplied to the mud per unit of time.

The initial pH of the circulating mud was 9.5. Tests of the circulating mud taken at various time intervals during the carbon dioxide injection showed a pH varying from about 7.2 to 8.3. By regulation of the amount of carbon dioxide injected in accordance with these periodic tests, the pH of the circulating mud could be held within the desired closely-confined limits.

Obviously many modifications and variations of the invention, as hereinbefore set forth, may be made without departing from the spirit and scope thereof, and therefore only such limitations should be imposed as are indicated in the appended claims.

We claim:

1. In the drilling of a well with the circulation of a drilling mud, the method of conditioning the drilling mud with carbon dioxide which comprises circulating the drilling mud through a confined passage under pressure, subliming and gasifying at least two confined portions of carbon dioxide ice, and alternately injecting carbon dioxide gas from first one and then another of said portions into said circulating mud stream within said confined passage when the pressure of gas formed from each of said confined portions substantially exceeds the pressure of the mud stream passing through said confined passage.

2. The method as defined in claim 1, in which the said portions of carbon dioxide ice are heated to augment sublimation and gasification.

3. The method as defined in claim 1, in which the carbon dioxide ice in said confined portions is in the form of small pieces.

4. Apparatus for the treatment of drilling mud with carbon dioxide during the circulation of the mud in well drilling comprising, in combination, a confined flow passage, means for circulating the drilling mud under pressure through said flow passage, a pair of carbon dioxide ice converters, a common header communicating with said flow passage, connections between each of said converters and said header, and means for alternately providing flow of carbon dioxide gas from each of said converters through its corresponding connection and the said header into said flow passage when the pressure of gasified carbon dioxide in each converter substantially exceeds the pressure of circulating drilling mud in said flow passage.

5. Apparatus as defined in claim 4, in which heating means are provided for each of said converters.

6. Apparatus for the treatment of drilling mud with carbon dioxide during the circulation of the mud in well drilling comprising, in combination, means for circulating drilling mud down the well to the locus of drilling and returning same together with suspended cuttings to the head of the well, a settling pit, a mud ditch for transferring said drilling mud with suspended cuttings from said well to said settling pit, means for returning settled drilling mud from said pit to the well, a mud gun within said mud ditch, a mud pump and a confined flow passage connecting said mud pump with said mud gun for recycling a portion of the drilling mud and forcing it under pressure through said flow passage and jetting it from said mud gun into the mud stream passing through said mud ditch, a pair of carbon dioxide ice converters, connections between each of said converters and said flow passage, and means for alternately providing flow of carbon dioxide gas from each of said converters into said flow passage when the pressure of gasified carbon dioxide in each of said converters substantially exceeds the pressure of recycled drilling mud in said flow passage.

WILLIAM W. ROBINSON.
ROBERT R. CRIPPEN.